US008448146B2

(12) United States Patent
Pasala et al.

(10) Patent No.: US 8,448,146 B2
(45) Date of Patent: May 21, 2013

(54) GENERATION OF FUNCTIONAL TESTS FOR RE-HOSTED APPLICATIONS

(75) Inventors: Anjaneyulu Pasala, Bangalore (IN); Sharal Nisha D'Souza, Mangalore (IN); Amar Lakshmi Gejje, Adoni (IN)

(73) Assignee: Infosys Limited, Bangalore (IN)

( * ) Notice: Subject to any disclaimer, the term of this patent is extended or adjusted under 35 U.S.C. 154(b) by 244 days.

(21) Appl. No.: 13/111,818

(22) Filed: May 19, 2011

(65) Prior Publication Data
US 2012/0254665 A1 Oct. 4, 2012

(30) Foreign Application Priority Data
Mar. 31, 2011 (IN) ............................ 1052/CHE/2011

(51) Int. Cl.
*G06F 9/44* (2006.01)

(52) U.S. Cl.
USPC .......................................................... 717/126

(58) Field of Classification Search
USPC ................................................. 717/124–126
See application file for complete search history.

(56) References Cited

U.S. PATENT DOCUMENTS

| | | | |
|---|---|---|---|
| 6,594,783 B1 | 7/2003 | Dollin et al. | |
| 6,804,634 B1 | 10/2004 | Holzmann et al. | |
| 7,278,135 B2 | 10/2007 | Czerwonka | |
| 7,299,382 B2 | 11/2007 | Jorapur | |
| 7,316,008 B1 | 1/2008 | Dutta | |
| 2006/0070048 A1 | 3/2006 | Li et al. | |
| 2006/0075305 A1 | 4/2006 | Robinson et al. | |
| 2006/0225056 A1 | 10/2006 | Mukkavilli | |
| 2008/0163159 A1 | 7/2008 | Oara et al. | |
| 2009/0018811 A1 | 1/2009 | Paradkar et al. | |
| 2009/0187892 A1 | 7/2009 | Ohi et al. | |
| 2009/0217303 A1* | 8/2009 | Grechanik et al. | 719/320 |
| 2009/0307664 A1* | 12/2009 | Huuck et al. | 717/124 |
| 2010/0218149 A1* | 8/2010 | Sasaki | 716/5 |
| 2011/0197180 A1* | 8/2011 | Huang et al. | 717/126 |

FOREIGN PATENT DOCUMENTS

| | | |
|---|---|---|
| CN | 11017458 A | 8/2007 |
| EP | 1926021 | 5/2008 |
| JP | 2006-24006 | 1/2006 |
| JP | 2008-52359 | 3/2008 |
| WO | WO0179996 | 10/2001 |
| WO | WO2008067265 | 6/2008 |

OTHER PUBLICATIONS

Basanieri et al., "A practical approach to UML-based derivation of integration tests," *Proc. Software Quality Week Europe QWE 2000*, Nov. 2000, paper 3T, 23 pages.

(Continued)

*Primary Examiner* — Anna Deng
(74) *Attorney, Agent, or Firm* — Klarquist Sparkman, LLP

(57) ABSTRACT

A system and method for generating functional tests to verify code migrated from a first host to a second host. In one embodiment, source code is analyzed in order to generate functional tests that can be used for testing the re-hosted application. In particular, user-input scenarios are extracted from the source code and system output responses are determined based on the user-input scenarios. Functional tests can then be generated using the extracted user-input scenarios and output responses to ensure that the re-hosted application responds in a like manner.

19 Claims, 10 Drawing Sheets

OTHER PUBLICATIONS

Briand et al., "A UML-Based Approach to System Testing," *'01 Proceedings of the 4th International Conference on the Unified Modeling Language, Modeling Languages, Concepts, and Tools*, Oct. 2001, 57 pages.

Gorthi et al., "Model-Based Automated Test Case Generation," SETLabs Briefings, vol. 6, No. 1, 2008, pp. 39-46.

Heumann, "Generating Test Cases From Use Cases," Rational Software, Jun. 2001, 11 pages.

Hartmann et al., "UML-Based Integration Testing," *Proceedings of the 2000 ACM SIGSOFT international symposium on Software testing and analysis*, Aug. 2000, 11 pages.

Linzhang et al.., "Generating Test Cases from UML Activity Diagram based on Gray-Box Method," *Proceedings of 2004 Software Engineering Conference*, Apr. 2004, 8 pages.

* cited by examiner

FIG. 9

SCENARIO / TEST CASES #1
Test Step(s)

| # | User Input | Conditions | Expected Output |
|---|---|---|---|
| 1 | implicit user input | NOT (eibealen=0) | |
| 2 | Console input: CHOICE: | Attention identifier key pressed=dfhenter AND NOT (choice1=0) AND NOT (choicei=spaces) AND choice='1' | |
| 3 | Console input: CHOICE1 | NOT (eibealen=2) AND Attention identifier key pressed=dfhenter AND NOT (choice1='1' OR choice1='2') | 1. Map name is map 1 Output is a. TIME: b. "invalid choice" c. DATE: |

SCENARIO / TEST CASES #2
Test Step(s)

| # | User Input | Conditions | Expected Output |
|---|---|---|---|
| 1 | implicit user input | NOT (eibealen=0) | |
| 2 | Console input: CHOICE: | Attention identifier key pressed=dfhenter AND NOT (choice1=0) AND NOT (choicei=spaces) AND choice='1' | |
| 3 | Console input: CHOICE1 | NOT (eibealen=2) AND Attention identifier key pressed=dfhenter AND choice1='1') | 1. Map name is map 1 Output is a. TIME: b. Screen to Add new user to Library Management System c. DATE: |

GENERATION OF FUNCTIONAL TESTS FOR RE-HOSTED APPLICATIONS

CROSS REFERENCE TO RELATED APPLICATIONS

This application claims priority from Application No. 1052/CHE/2011, filed in India on Mar. 31, 2011, which is hereby incorporated by reference herein.

FIELD

The present application concerns re-hosting applications, and, more particularly, generating functional tests for functional verification of re-hosted applications.

BACKGROUND

It is estimated that the combined value of all business-based COBOL applications running on mainframes is in excess of a trillion US dollars. Some estimates indicate that there are nearly 180 billion lines of COBOL code in use around the world. The cost of maintaining these legacy applications is increasing and organizations are having difficulty in obtaining trained people, as the code continues to be outdated.

One solution is to migrate these applications from mainframes to a newer and cheaper maintenance systems based on Microsoft Windows® or Linux®. Such migration is called "re-hosting" of legacy applications. Similarly, due to the end of mainstream support for Visual Basic 6 (VB), organizations have started migrating VB applications to VB.net, which further increases the scope of re-hosting of applications. It is estimated that billions of dollars will be spent on re-hosting of such legacy applications in the coming years.

To facilitate successful re-hosting and migration, tools have been developed that automatically port COBOL source code running on mainframes onto the new systems, specifically Microsoft Windows® based systems. Micro Focus Studio® is one such tool that re-hosts COBOL applications running on mainframes to Microsoft Windows® without adding new code or changing existing code manually.

For proper migration, the re-hosted applications need to be verified for its original functionality on the new systems. To ascertain the accuracy of the original functionality, organizations perform system testing of re-hosted applications in new environments using functional test cases. However, being legacy applications, in many instances test cases are not available in any form. Further, due to non-availability of software requirements specifications or design artifacts for these legacy applications, the existing automatic test case generation techniques based on such artifacts cannot be used. Therefore, testers are facing challenges to test the re-hosted applications on new platforms.

In practice, the test designers create functional test cases or scenarios based on their own understanding of the system functionality. Once these test cases are executed successfully, it is assumed that the re-hosting or migration is successful. This process of verification is labor intensive and also prone to errors because some functionalities might have been missed, leaving some parts of the application untested.

SUMMARY

A system and method are disclosed generating functional tests for verifying code migrated from a first host to a second host. For example, the first host can have a central processing unit (CPU) that is different from the CPU of the second host, such as the case when code is migrated from a mainframe host to a personal computer.

In one embodiment, source code is analyzed in order to generate functional tests that can be used for testing the re-hosted application. In particular, user-input scenarios are extracted from the source code and output responses are determined based on the user-input scenarios. Functional tests can then be generated using the extracted user-input scenarios and output responses to ensure that the re-hosted application responds in a like manner.

In a further embodiment, functional behavior of the source code application can be defined using a plurality of units of behavior, wherein a unit of behavior includes a user input, a specified condition on an input data value, and an application response to the user input and the specified condition. Functional tests for the re-hosted application can then be automatically generated using the determined units of behavior that were extracted from the source code.

In a particular embodiment, an Abstract Syntax Tree (AST) is generated from analyzing the source code. A Control Flow Graph (CFG) is built from the AST to represent all possible paths through the code. Test scenarios can then be generated to ensure all possible paths are tested in the re-hosted application.

The foregoing and other objects, features, and advantages of the invention will become more apparent from the following detailed description, which proceeds with reference to the accompanying figures.

BRIEF DESCRIPTION OF THE DRAWINGS

FIG. 9 is an example of test cases generated in HTML format.

DETAILED DESCRIPTION

Figure 1:
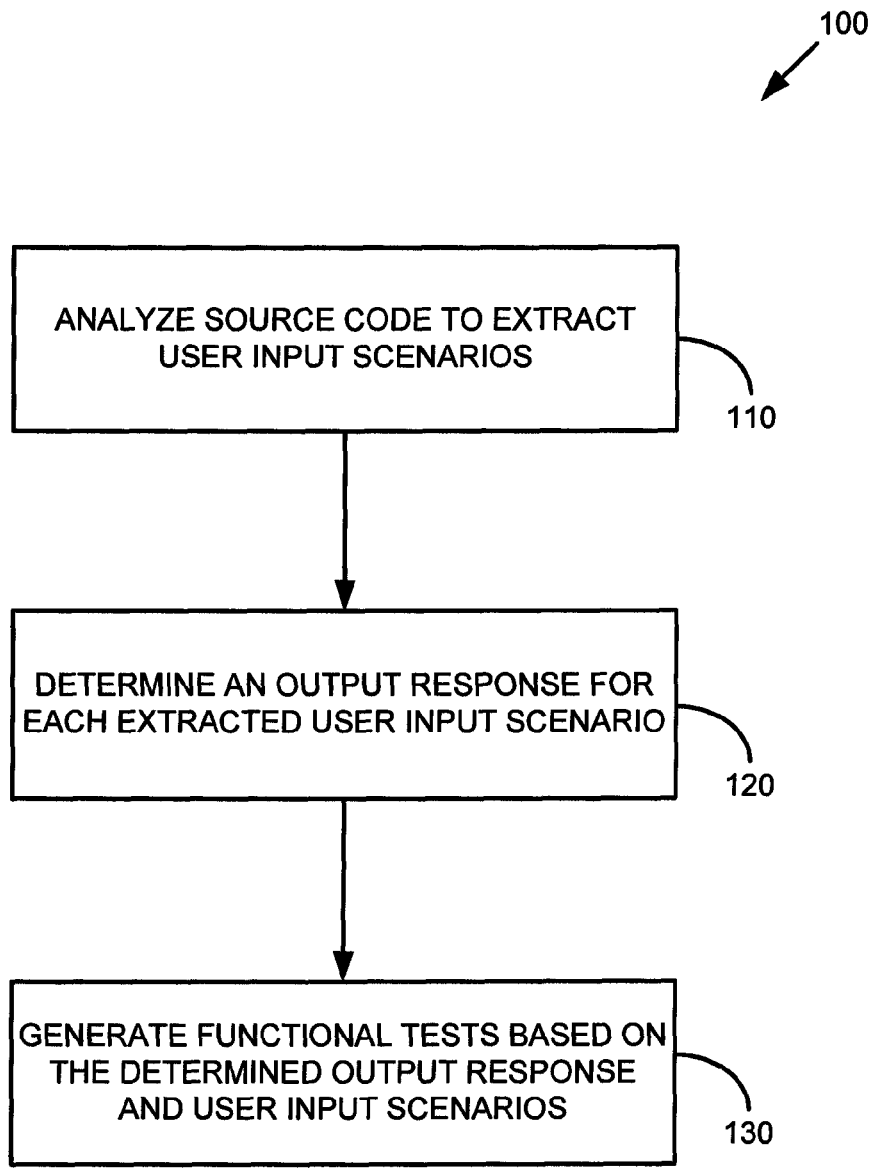
FIG. 1 is a flowchart of a method for generating functional tests for a re-hosted application.

FIG. 1 is a flowchart of an embodiment for generating functional tests. In process block 110, source code is analyzed to extract user input scenarios. The source code generally includes human-readable program statements that are compiled into object code for execution on a computer. In process block 120 an output response is determined for each extracted user input scenario. By determining all user input scenarios, all paths that can be taken through the source code are identified, which allows for a thorough verification of the re-hosted application's functionality. In process block 130, the functional tests are generated using the determined output response and user input scenarios. Thus, by direct analysis of the source code, user and system interactions can be extracted and functional tests can be generated. Generally, for re-hosted applications, there is little documentation provided. Prior methods needed significant testing to be performed in order to ensure all paths were taken. Using the method of FIG. 1, the quality of the functional tests is very high because every path in the source code can be identified.

Figure 2:
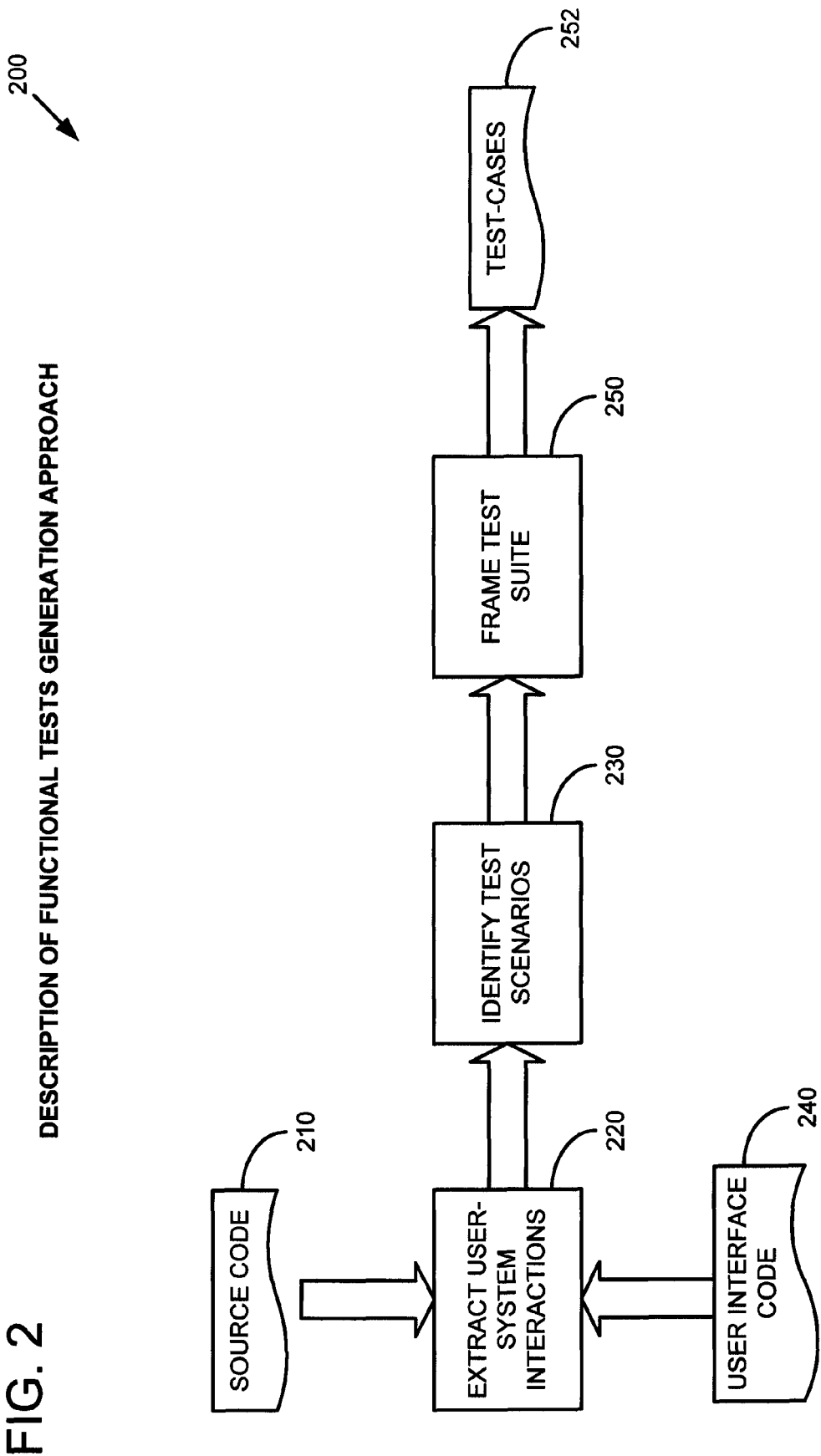
FIG. 2 is a flowchart of an embodiment for generating the functional tests.

FIG. 2 shows a flowchart of a method according to one embodiment. Source code is provided at 210. In process block 220, user-system interactions are extracted from the source code. From a testing perspective, the application functional behavior is characterized as a set of user interactions with the system, which can be verified. The user-system interactions are part of the independent execution paths in the source code. User input and output parameters are obtained by analyzing the user interface code 240. For example, each user interface screen can be analyzed and candidate variables can be extracted from the user interface screens. In certain applications, such as CICS-based COBAL applications, Basic Mapping Support (BMS) maps can be used to extract the candidate variables. In one embodiment, described further below, these independent paths are captured by building the Abstract Syntax Tree (AST). At process block 230, test scenarios are identified. In some embodiments, a unit of behavior is defined as including user input, conditions on input data values, and system output. A set of units of behaviors is an independent path through the source code and represents a single test scenario. All the test scenarios together form the functional test suite. In process block 250, the test suite is framed, meaning that it is put into the desired format. Example formats include XML, HTML, or any other mark-up language. Other formats can also be used, based on the application. The resultant test cases 252 are generated that can be used for testing the re-hosted application.

Figure 3:
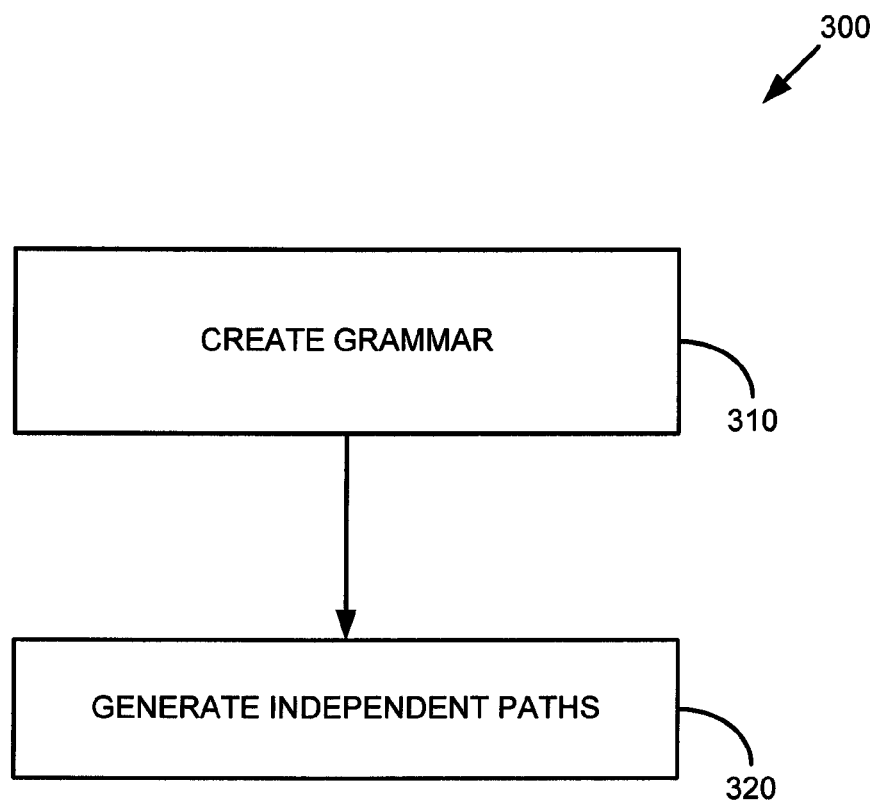
FIG. 3 is a flowchart of an embodiment for extracting user interactions.

FIG. 3 is a flowchart of a method showing additional process blocks corresponding to process block 220 of FIG. 2. In particular, FIG. 3 shows an embodiment of a method for extracting the user interactions. In process block 310, grammar is created. Initially, it is desirable to build the syntax grammar for a complete specification of a given programming language. Such a build is a one-time activity. For example, a syntax grammar for CICS-based COBOL programming language specifications can be created using a parser-generator. Once the syntax grammar is created, a code parser can be automatically generated so that any application written in CICS based COBOL can be parsed. In process block 320, independent paths through the source code can be generated. In one embodiment, user interactions (inputs and outputs) can be obtained by generating an AST from the source code. When constructing the AST, the grammar can be augmented with tree-writing rules by arranging tokens from a lexical analyzer. The AST serves as an intermediate form before a further translation is carried out.

Figure 4:
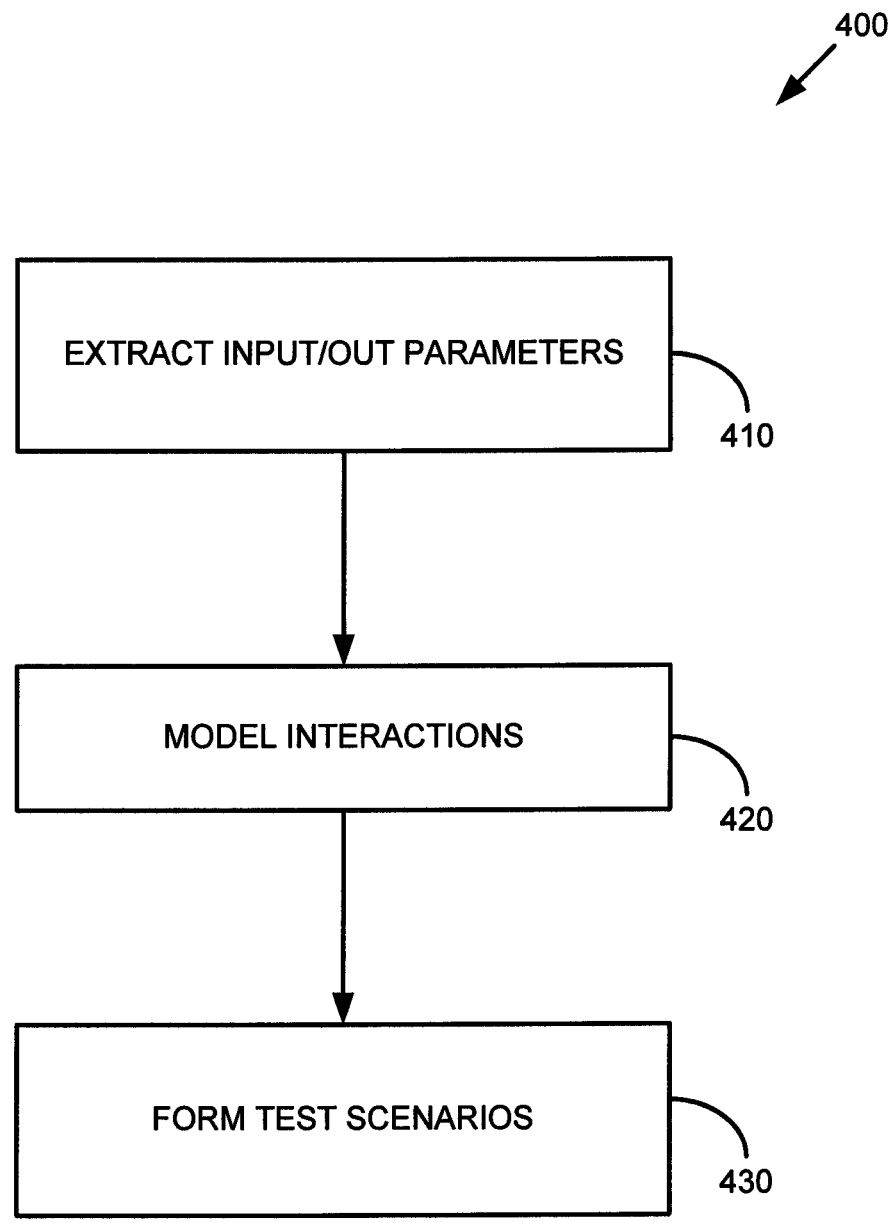
FIG. 4 is a flowchart of an embodiment for identifying test scenarios.

FIG. 4 is a flowchart of a method showing additional process blocks corresponding to process block 230 of FIG. 2. In process block 410, input and output parameters are extracted. Typically, the user input and output is a part of the UI code (GUI files) such as BMS maps, HTML files (in case of web based applications), etc. The input parameters from the UI files accepts the user input data value and an action is performed based on the direct or indirect reference of the input parameter in the application source code. Therefore, all input and output parameters can be obtained from the UI source code. The process of obtaining an input and output parameters list can be obtained by a separate parser depending on the programming language used to develop the UI. The parser can parse the UI code for all editable data fields and capture their variable names as input parameters and the non-editable fields as output parameters in the application source code. These set of parameters can be used in the tree-parser to extract the user-system interactions while parsing the nodes of the AST.

In process block 420, interactions can be modeled. The AST, user input and the set of input and output parameters are linked together to form a Control Flow Graph (CFG). The CFG can be used to show all paths that can be traversed through the application during its execution. In one embodiment, only nodes in the AST that relate to user input, conditionals and system outputs are used, while other nodes are ignored. For example, whenever an if conditional statement is found in the AST, correspondingly a decision node can be created and added to the CFG. While analyzing the nodes in the AST, whenever code corresponding to send information from the user input screen is present, it is considered to be the user input and an input node is created and added in the CFG. Similarly, whenever code corresponding to receive information is present, it is considered to be the system output and an output node is created and added to the CFG. At the end of the AST analysis, the CFG has the complete paths of code traversal that represent a set of sequence of units of behaviors. These different paths can be those tested for verification of the functionality of the application. Further, to extract the complete use case scenarios, it is desirable to extract the decisions/control structures wherein an input data value is tested. The challenge is to handle the decision nodes that do not directly test the input data value. In a typical application, the input parameter obtained can be further indirectly referred in the code through local variables. These cases can also be identified and captured. Therefore, whenever the conditional statements test the conditions having these local variables, correspondingly a decision node can be created and added in the CFG. For instance, consider the code snippet given below in which custnoi is the input parameter obtained from the BMS mapset:

move custnoi to cust
    evaluate cust
    when 0
    move "that customer does not exist." to messageo
    perform 1400-send-customer-map The input parameter custnoi is referenced with the local parameter cust during the evaluation of the condition. This amounts to testing the value of input parameter. Since the value of the input is tested in the following condition, these decision details can also be captured in the test cases for system testing. Therefore, a conditional node is added to the CFG to improve the code coverage of the application using the generated test suite. Similarly, many applications contain database interactions that result in more system (output/error) messages being displayed to the user reporting the nature of failure. All these database transaction messages can also be verified during the testing. All such database error conditions and successful transactions can be captured by creating a corresponding decision node. An output node can be created to represent these error messages that can be shown to the user as output.

In process block 430, test scenarios can be formed. Every independent path corresponds to a test scenario which can be equated to a sequence of "Unit of Behaviors". While further processing such independent paths, it becomes desirable to know the start and end of the path. Hence, while traversing each path in the AST a START node can be added explicitly in the CFG to mark the beginning of the test scenario. Whenever there are no more statements in the independent path being traversed or there is an explicit terminating statement in the source code, an explicit END node can be inserted in the CFG to mark the end of that particular path. As a result, the set of input, conditions and output nodes starting from START node to END node in the CFG forms the corresponding test scenario.

For example, consider the following code snippet for a CICS-based COBOL program. Lines 2-8 are the main procedure. When an end of this procedure is reached, an END node can be created in the CFG which states that control cannot be further transferred anyplace. This then marks the end of the user-system interactions and the test scenario.

1. procedure division.
2. 0000-process-customer-inquiry.
3. evaluate true
4. when eibcalen=zero move "please input a number" to messageo
5. perform 1400-send-customer-map
6. when eibaid=dfhenter
7. perform 1000-process-customer-map
8. end-evaluate.
9. 1000-process-customer-map.
10. perform 1100-receive-customer-map.
11. evaluate custnoi
12. when 0
13. move "customer does not exist." to messageo
14. perform 1400-send-customer-map
15. when 1
16. move cmlastname to lnameo
17. move cmfirstname to fnameo
18. perform 1400-send-customer-map
19. when other
20. move "Not a Valid key" to messageo
21. perform 1400-send-customer-map
22. end-evaluate.
23. 1100-receive-customer-map.
24. exec cics
25. receive map ('inqmap1')

In case of COBOL based applications, these input and output variables are part of the BMS map. Sample BMS source code is shown below, which corresponds to the code snippet above. The message "Customer number" corresponds to the input variable custno. This message is used as input message in the test scenarios that are generated for the corresponding source code. Similarly, the output messages are also extracted.

Inqmap1 dfhmdi size=(24,80), x
1. length=42, x
2. attrb=(norm,prot), x
3. initial='type customer number.'
4. dfhmdf pos=(5,1), x
5. attrb=(norm,prot), x
6. color=green, x
7. initial='customer number'
8. custno dfhmdfpos=(5,26), x
9. attrb=(norm,unprot,ic), x
10. dfhmdfpos=(5,33), x
11. length=1, x
12. attrb=(askip)
13. dfhmdf pos=(7,1), x
14. attrb=(norm,prot), x
15. color=green, x
16. initial='name and address . . . :'
17. lname dfhmdfpos=(7,26), x
18. length=30, x
19. attrb=(norm,prot), x
20. . . .

Figure 5:
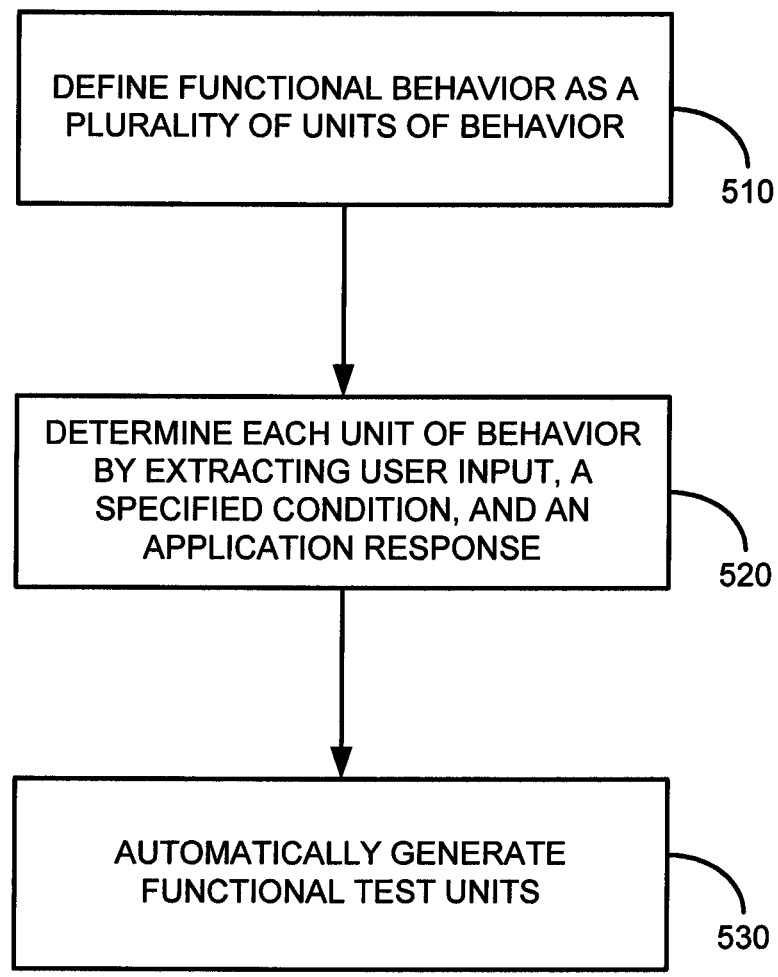
FIG. 5 is a flowchart of an embodiment for generating functional tests using units of behavior.

FIG. 5 is another flowchart of an embodiment that can be used. In process block 510, functional behavior of the source code can be defined as a plurality of units of behavior. A unit of behavior can include a unique combination of user input, a specified condition on the input data values, and a predicted response. In process block 520, user input values, specified conditions and the application response are extracted from the source code in order to determine the units of behavior. One unit of behavior can correspond to a single test step in a given test scenario. Therefore, a complete sequence of such units of behaviors for a given functionality constitutes one test scenario. In process block 530, these functional test units are automatically generated by analyzing the applications source code and systematically extracting these triplets of information.

FIGS. 6-9 show a particular implementation of an embodiment used for generating functional tests for an application migrated from one host, such as a mainframe, to another host, such as a personal computer running Microsoft Windows®. A prototype tool used a parser-generator to parse the application source code. Two parser-generators were considered: JavaCC and ANTLR. ANTLR was chosen for its (1) versatility, (2) features such as powerful and easy to use tree building capabilities and (3) documentation. ANTLR allows creation of AST for any programming language specifications such as COBOL, Java, C#, etc. AST parsers are generated in a platform independent language, such as Java.

Figure 6:
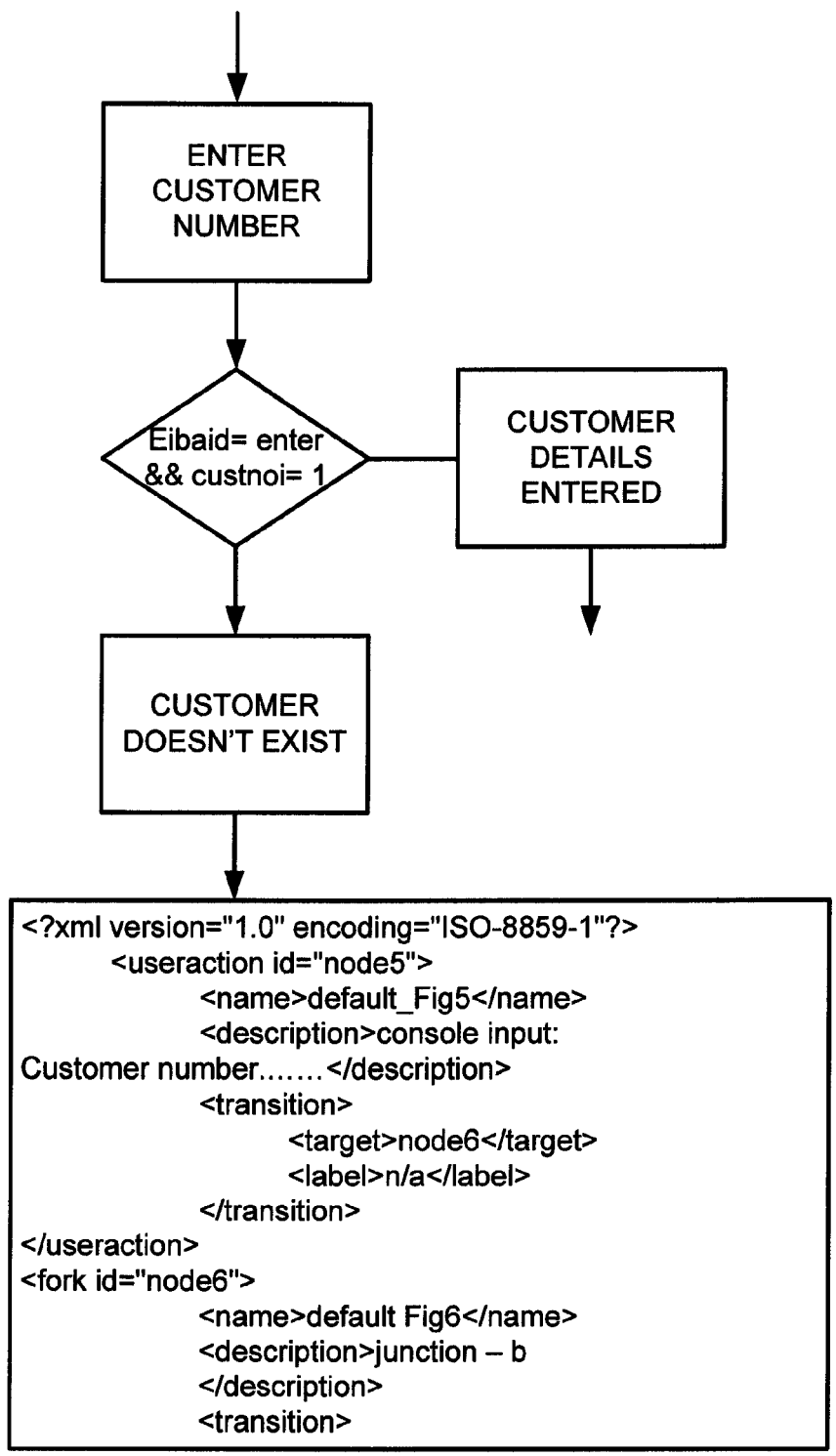
FIG. 6 is an example implementation with a test file generated.
Figure 7:
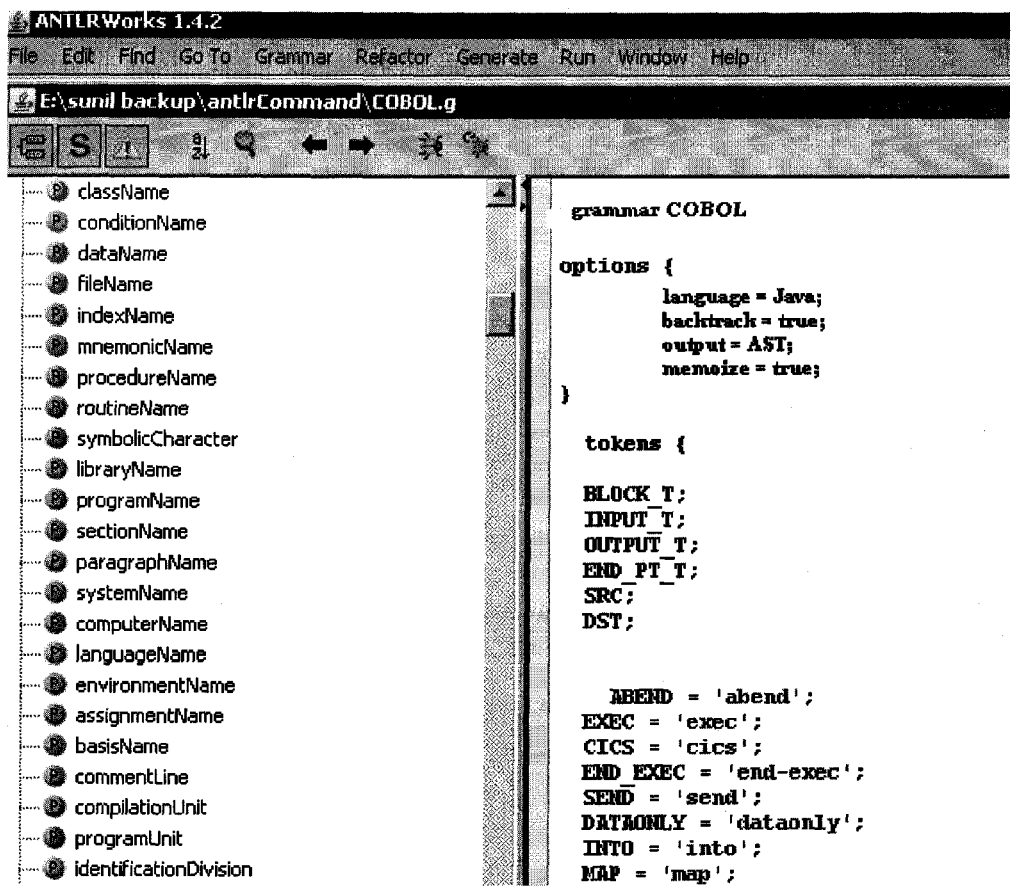
FIG. 7 is an example of syntax grammar created in the generation of functional tests.
Figure 8:
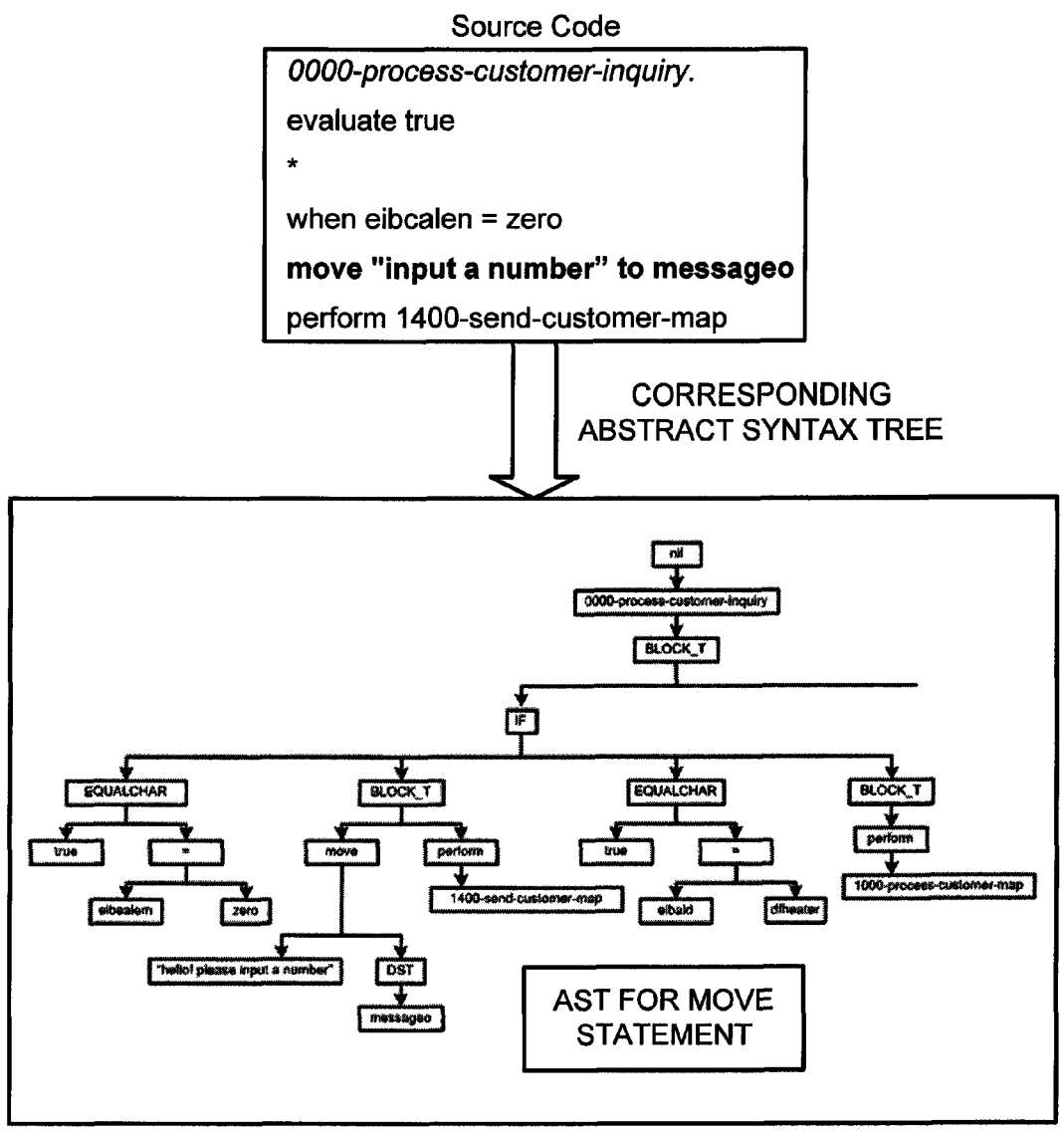
FIG. 8 is an example Abstract Syntax Tree used in generating functional tests.

FIG. 6 shows an XML file representation of functional test cases. Three parsers were built for the extraction of test cases from CICS-based COBOL source code. First, a Code Parser parses the CICS based COBOL source code and generates AST. Second, an IOParser parses the BMS file (IO file) to extract the input/output parameters. And, third, a TreeParser parses/analyzes the AST to capture test scenario. A syntax grammar file was created for complete CICS based COBOL language specifications. This grammar file is called a CodeParser. An example of syntax grammar file created for COBOL programming language specifications is shown in FIG. 7. While building the syntax grammar, explicit commands are specified in the grammar file to construct AST in the desired format.

To construct AST, the grammar can be augmented with the tree-writing rules which arrange tokens from the lexer, into an AST format. For example, consider the AST construction for the following COBOL statement:

move "input a number" to message (means the message variable is assigned "input a number" text)

In the grammar file, if the tree-writing rule->^ (MOVE $src ^ (DST $dst+)) is specified, it generates AST for that statement. In the above statement, src is "input a number" and similarly dst is message. The AST assists in extracting the various independent paths the application code has taken. The corresponding sub-tree for the above statement is highlighted in the constructed AST shown in FIG. 8. An IOParser can be developed to obtain the list of input/output parameters from BMS maps that are referenced in the code. The output of the IOParser is a set of input and output parameter lists that have been used to analyze the AST in the next parsing stage. The TreeParser can be developed to parse AST and build the CFG. TreeParser has been developed using the concepts discussed above where nodes belonging to user-system interactions are captured from AST. These nodes can be used to build CFG.

FIG. 6 shows the CFG constructed for the sample CICS/COBOL code discussed above. In the CFG, each node can have four types of information: 1) Node Type—signifies whether it is a user input, decision, system output etc; 2) Node name—stores the unique name to each node for further reference; 3) Description—is the text to be displayed in the test case for that particular node; 4) Target node—the name of the node to which it is connected and to be traversed.

Using the depth first search algorithm, all the paths in the CFG are obtained in XML, which are fundamentally the test scenarios in XML. However, to make it more readable the following techniques can be used. The test cases generated are from source code hence readability is an issue. Whenever analyzing the statements in the AST, if any indirect reference to the input variable is made in the source code, the text to be displayed can be replaced with the input variable in the corresponding conditional node. Also when a decision node is created in the CFG, the text that is displayed in the test case under conditions may not be in the form that is easily understood by the user because language specific constructs are displayed. Hence, to address this issue in COBOL, whenever programming language specific words are encountered in the test case, they can be replaced with their standard definitions. Consider the below code snippet, evaluate eibaid
 when dfhpf1
 perform f0000-help-para
 when dfhenter
 perform f0003-enter-para Language specific words like eibaid, can be replaced with the standard definition "Attention Identifier Key pressed" in the test case. Some of the COBOL language specific keywords along with the replaced text are shown in the following table:

TABLE 1

COBOL language specific keywords and their meaningful messages

| | |
|---|---|
| EIBAID | Attention Identifier Key |
| EIBCALEN | Execution Interface Block Communication Area Length |
| EIBCPOSN | Controlling the cursor on receive map |
| ... | ... |

Using a prototype tool developed, case studies have been conducted using an industrial application. The application typically allows the user to add a member, delete a member and library transactions such as issue a book, return a book etc. The application has three main modules and the tool generated the test cases for all the modules.

A sample test scenarios generated is shown in FIG. 9. Creation and use of the data values along with the test scenarios can be automatically generated. The above-described approach is quite generic and can be used for applications developed using any programming language. The approach and tool is based on capturing and analyzing the structured sequence of user-system interactions from source code.

Figure 10:
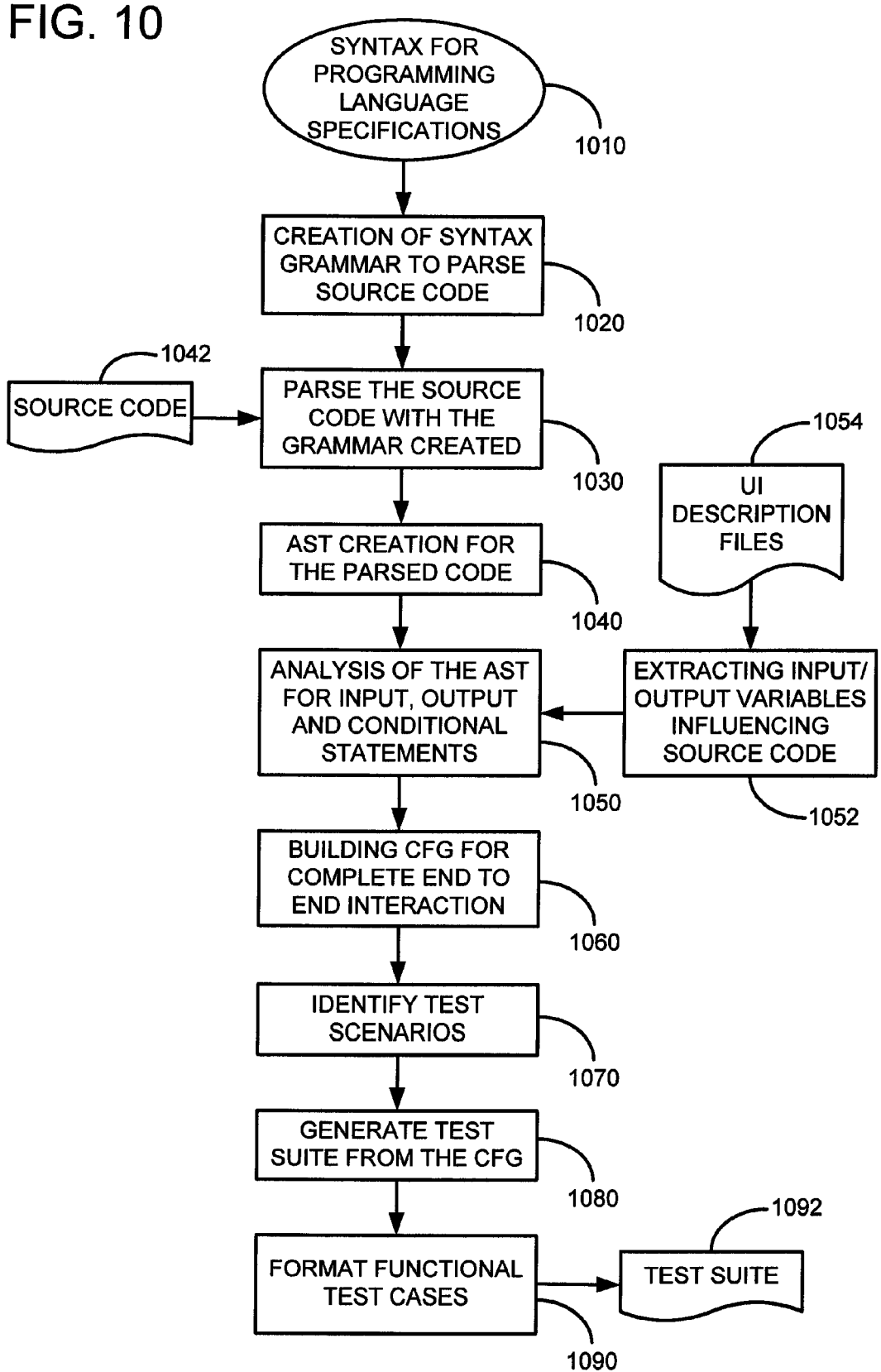
FIG. 10 is an overall system flow according to one embodiment.

FIG. 10 shows an overall flow illustrating an embodiment of the functional test case generation. As shown at 1010, a syntax file for programming language specifications is input. In process block 1020, syntax grammar is created for an entire programming language specification to parse the source code written in that programming language. In process block 1030, the source code 1042 is parsed. In process block 1040, the AST is created for the parsed source code 1042. In process block 1050, the AST is analyzed for input, output and conditional statements. The input and output variables are extracted in process block 1052 from UI description files 1054. In process block 1060, a CFG is built to show end-to-end (start to finish) transactions. In process block 1070, the test scenarios are identified. In process block 1080, the test suite is generated from the CFG. In process block 1090, the functional test cases are formatted. The resultant test suite 1092 is then output to a file or is displayed.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. In a computer system comprising a processor, a method for generating functional tests for verifying code migrated from a first host to a second host, comprising:
   analyzing source code associated with the first host to extract user input scenarios, wherein analyzing the source code further includes identifying test scenarios for the source code by extracting input/output parameters from user interface code;
   wherein extracting input/output parameters includes:
   (i) parsing the source code for editable data fields and non-editable fields;
   (ii) determining variable names associated with the editable data fields and using the variable names as input parameters; and
   (iii) determining variable names associated with non-editable data fields and using the variable names as output parameters;
   determining based on the analysis, an output response for each of the extracted user input scenarios; and
   generating functional tests for testing the code on the second host using the extracted user input scenarios and determined output responses.

2. The method of claim 1, wherein the extracted user input scenarios include candidate user input and conditions on input data values.

3. The method of claim 1, wherein analyzing the source code includes building an abstract syntax tree for the source code.

4. The method of claim 3, wherein building the abstract syntax tree further includes creating a syntax grammar for language syntax specifications of the source code.

5. The method of claim 4, wherein building the abstract syntax tree further includes traversing independent paths through the source code.

6. The method of claim 5, further including relating the independent paths to functions in the source code.

7. The method of claim 2, further including generating a set of units of behaviors, wherein each unit of behavior includes a user input, conditions on the input data values, and system output corresponding to the user input and conditions on the input data values.

8. The method of claim 1, wherein analyzing the source code further includes modeling interactions using the input/output parameters, and forming test scenarios using the modeled interactions.

9. In a computer system comprising a processor, a method for generating functional tests in order to verify a re-hosted source code application, comprising:
   defining functional behavior of the source code application as a plurality of units of behavior, wherein a unit of behavior includes a user input, a specified condition on an input data value, and an application response to the user input and the specified condition;
   determining each unit of behavior by extracting its associated user input, specified condition and application response automatically by traversing logical paths through the source code application;
   analyzing the source code application; wherein analyzing the source code application comprises identifying test scenarios for the source code application by extracting input/output parameters from user interface code;
   wherein extracting input/output parameters comprises:
   (i) parsing the source code application for editable data fields and non-editable fields;
   (ii) determining variable names associated with the editable data fields and using the variable names as input parameters; and
   (iii) determining variable names associated with non-editable data fields and using the variable names as output parameters; and
   automatically generating the functional tests using the determined units of behavior.

10. The method of claim 9, wherein determining each unit of behavior includes generating an abstract syntax tree from the source code application and determining the logical paths through the source code application using the abstract syntax tree.

11. The method of claim 10, further including determining a start and an end of each logical path through the source code application by traversing the abstract syntax tree and finding at least an end node in the abstract syntax tree.

12. The method of claim 9, wherein automatically generating the functional tests includes generating the tests in a predetermined format selected from a group consisting of XML and HTML.

13. The method of claim 9, wherein determining each unit of behavior includes analyzing the source code application by creating syntax grammar to parse and construct an abstract syntax tree corresponding to user inputs and system outputs.

14. The method of claim 13, further including building a control flow graph that represents the logical paths traversed, the control flow graph built using each node from the abstract syntax tree and input/output variables from user screens in the source code application.

15. A computer-readable storage having instructions thereon for executing the method of claim 9.

16. In a computer system comprising a processor, a method for generating functional tests for verifying a re-hosted application, comprising:
   analyzing source code of the application by constructing an abstract syntax tree for a plurality of user inputs and system outputs, wherein analyzing the source code further includes identifying test scenarios for the source code, wherein the identifying comprises extracting input/output parameters from user interface code;
   wherein extracting input/output parameters includes:
   (i) parsing the source code for editable data fields and non-editable fields;
   (ii) determining variable names associated with the editable data fields and using the variable names as input parameters; and
   (iii) determining variable names associated with non-editable data fields and using the variable names as output parameters;
   building a model of user and system interactions from the abstract syntax tree that represents paths through the source code; and
   generating test cases in a format that includes a sequences of user input, conditions, and system output that can be used for verification of the source code after it is migrated to a different host.

17. The method of claim 16, wherein analyzing includes creating syntax grammar of source code and parsing the source code with the created syntax grammar.

18. The method of claim 16, wherein building the model of the user and system interactions includes building a control flow graph, which is a representation of all paths through the source code.

19. The method of claim 16, wherein constructing the abstract syntax tree includes taking into consideration conditions on input values.

* * * * *